(12) United States Patent
Goodfellow

(10) Patent No.: US 7,164,816 B2
(45) Date of Patent: Jan. 16, 2007

(54) SIGNAL ADDITION TO A WAVE DIVISION MULTIPLEX SYSTEM

(75) Inventor: Robert Charles Goodfellow, Brackley (GB)

(73) Assignee: Ericsson AB, Stockholm (SE)

(*) Notice: Subject to any disclaimer, the term of this patent is extended or adjusted under 35 U.S.C. 154(b) by 209 days.

(21) Appl. No.: 10/472,665

(22) PCT Filed: Feb. 11, 2002

(86) PCT No.: PCT/GB02/00584

§ 371 (c)(1),
(2), (4) Date: Apr. 1, 2004

(87) PCT Pub. No.: WO02/093806

PCT Pub. Date: Nov. 21, 2002

(65) Prior Publication Data
US 2004/0151420 A1   Aug. 5, 2004

(30) Foreign Application Priority Data
May 15, 2001 (GB) ................ 0111822.3

(51) Int. Cl.
G02B 6/42 (2006.01)
(52) U.S. Cl. ................ 385/15; 385/37; 385/140
(58) Field of Classification Search ................ 385/14, 385/15, 37, 140, 147
See application file for complete search history.

(56) References Cited
U.S. PATENT DOCUMENTS 6,091,869 A   7/2000 Sundelin
6,122,299 A   9/2000 DeMars et al.
6,278,536 B1 * 8/2001 Kai et al. ................ 398/79

FOREIGN PATENT DOCUMENTS

| EP | 0 478 060 A2 | 4/1992 |
| EP | 0 944 192 A2 | 9/1999 |
| EP | 0 948 153 A2 | 10/1999 |
| EP | 0 967 752 A2 | 12/1999 |
| EP | 1 065 820 A2 | 1/2001 |
| JP | 11127121 | 5/1999 |
| WO | WO 00/49752 | 8/2000 |

* cited by examiner

Primary Examiner—Kevin S. Wood
(74) Attorney, Agent, or Firm—Kirschstein, et al.

(57) ABSTRACT

A telecommunications system is formed from a single mode optical fiber carrying Wave Division Multiplex (WDM) traffic. A transmission fiber coupler is arranged to couple signals from channels to be added to the single mode optical fiber. A coupler connects the channels carrying the signals to be added to the input of an optical amplifier, the output of the amplifier being connected in series to the transmission fiber coupler by a switchable multiband band-stop filter arranged to pass only signals having the wavelength of a signal or signals to be added to the WDM traffic. The switchable multiband band-stop filter may be a fiber Bragg filter, a selectable stack of filters or an assembly of bleachable filters. A switchable multiband filter is formed from a stack of layers of a semiconductor bleachable medium whereby the bleaching threshold is that of each single layer and the attenuation is the sum of the transmissions through all the layers comprising the stack.

15 Claims, 4 Drawing Sheets

Tunable Transmitter $\lambda_1$ or $\lambda_n$

SIGNAL ADDITION TO A WAVE DIVISION MULTIPLEX SYSTEM

Communications traffic is increasing year by year by around 100% in some areas due to internet, mobile telephony, interactive entertainment, video conferencing and communications, and information systems. Optical fibres are being operated with many different wavelength channels in wavelength division multiplexed (WDM) systems. These fibres are being used in communications networks in which traffic may be carried on different carrier wavelengths through several switching points. These optical networks may be constructed from optical WDM line systems connected by optical switches and from optical WDM rings interconnected to allow traffic to be selectively switched between rings. A convenient way to construct such rings is from a basic building block at which wavelength traffic channels may be added or dropped from the ring. Such an equipment is called an Optical Add Drop Multiplexer for ring networks. Optical Add Drop Multiplexer functions are also used in WDM line systems to permit a fraction of the WDM channels to be dropped at intermediate points.

Adding and dropping of wavelength channels to a single mode fibre can be accomplished by means of broadband splitter/combiners such as fibre fused couplers or silica waveguides formed in pairs and run with small dimensional spacingless than a wavelength so that coupling between the optical fields occurs. When such couplers are used, splitting/coupling losses are very severe. For example, with two way coupling, loss is more than 50% and for 32 way coupling losses are more than 97%.

Alternatively coupling can be achieved using diffractive and dispersive elements to make wavelength division multiplexing combiners (WDM combiners). Such WDM combiners may have n input ports and one output port. To couple into the output port it is necessary to introduce each wavelength channel into its correct port. Such devices have, in practice, coupling losses between 1 dB (~80%) to 7 dB (~20%) depending on quality and on band pass characteristics of the filtering of each channel.

A communications network becomes most economic when it becomes possible to load up all parts of the network and when it is possible to provide alternative 'protection' paths for traffic. This ideal is approached when traffic can be easily switched from one wavelength channel to another and when all switch interconnection options are available, ie when the switches are 'non-blocking'.

If wavelength charging is introduced it becomes necessary to have switches associated with the WDM combiners. Alternatively splitter/combiners can be used but then optical amplifiers become necessary to overcome the large losses incurred during the splitter/combiner functions. The amplifiers introduce 'noise' due to Amplified Spontaneous Emission (ASE) onto the traffic paths. This manifests as reduced optical signal to noise ratio (OSNR) in the optical signal carrying the communications traffic.

According to the present invention there is provided a telecommunications system comprising a single mode optical fibre carrying Wave Division Multiplex (WDM) traffic and including a transmission fibre coupler arranged to couple signals from channels to be added to the single mode optical fibre, further comprising coupling means to connect the channels carrying the signals to be added to the input of an optical amplifier, the output of the amplifier being connected in series to the transmission fibre coupler by a switchable multiband band-stop filter arranged to pass with low loss only signals having the wavelength of a signal or signals to be added to the WDM traffic and to attenuate all signals at wavelengths not having the wavelength of the signal or signals to be added to the WDM traffic.

There is further provided a switchable multiband filter comprising a stack of layers of a semiconductor bleachable medium whereby the bleaching threshold is that of each single layer and the attenuation is the sum of the transmissions through all the layers comprising the stack.

The present invention will now be described, by way of example, with reference to the accompanying drawings, in which:

FIGS. 1(a) to 1(f) show methods by which traffic can be added at an optical add/drop-node;

Figure 1A:
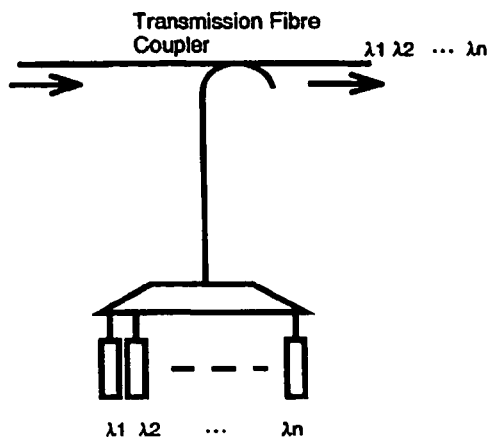
FIGS. 1(a) to 1(f) show methods by which traffic can be added at an Optical Add Drop Node and comments regarding each method are included.

FIG. 1(a) shows a method where channels are connected to a WDM multiplexer and then to a transmission fibre coupler. This method can be scaled to large numbers of channels (WDM couplers for 80 channels or more are available commercially today). The losses may be 3 dB for a coupler and 3 dB for a WDM multiplexer, a total of 6 dB and do not change significantly with channel count (number of channels).

Figure 1B:
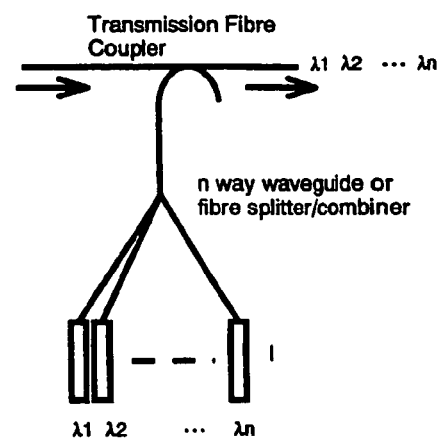

FIG. 1(b) shows where the channels are connected to an n-way waveguide or a fibre splitter/combiner functioning as a coupler. There is a loss of 1/n due to the multiway coupler and a loss of ½ due to the transmission fibre coupler, a loss of 12 dB for an 8-way coupler and 3 dB for the transmission fibre coupler, a total of 15 dB and losses rise rapidly with channel court.

FIG. 1(c) provides a means to bypass the transmission coupler loss. This requires n off 2×2 switches between a pair of back-to-back WDM multiplexers at each channel add/drop, where n is the channel count.

FIG. 1(d) shows how through traffic where required passes through a switchable filter. This filter is equipped to selectively attenuate each through wavelength channel and to heavily attenuate or effectively block, selected channels from which traffic may have been dropped and/or onto which new traffic is to be added. Scaling to large channel counts results in linearly scaling losses with this arrangement if a broadband (non wavelength selective) combiner is used, so high power optical transmitters are necessary.

FIG. 1(e) shows how 'flexibility' can be provided, that is any wavelength can be added to any input port, if a WDM multiplexer, an optical switch and a transmission fibre coupler are used. The loss is ½×½×½=⅛. Currently low loss switches are expensive. The whole switch must be included to afford 'flexibility' even if only a few channels are required to be added. The switches may for example be 3-D type Micro-Electrical Machine in Silicon (MEMS) which scale to large port counts with low loss. The optical multiplexer may also have low loss for large channel counts. Hence this approach scales but total loss is still significant and the cost and complexity of such an implementation is large.

Figure 1:
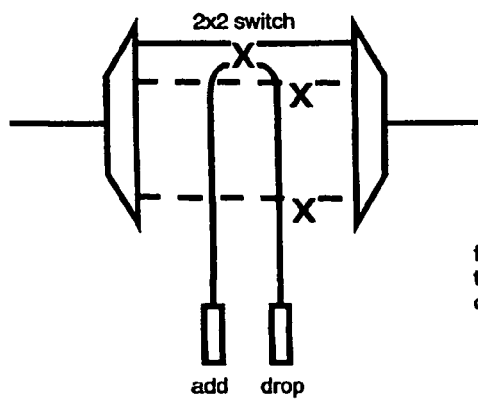
Figure 1:
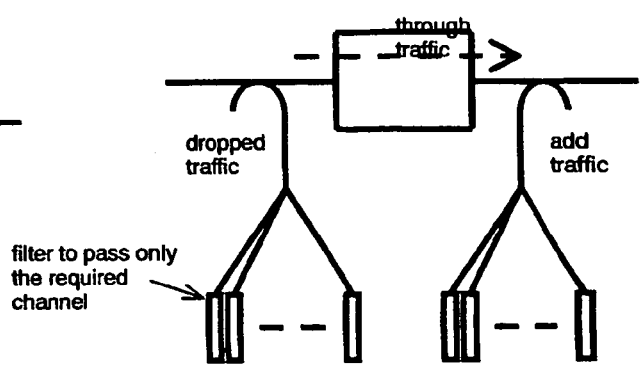
Figure 1:
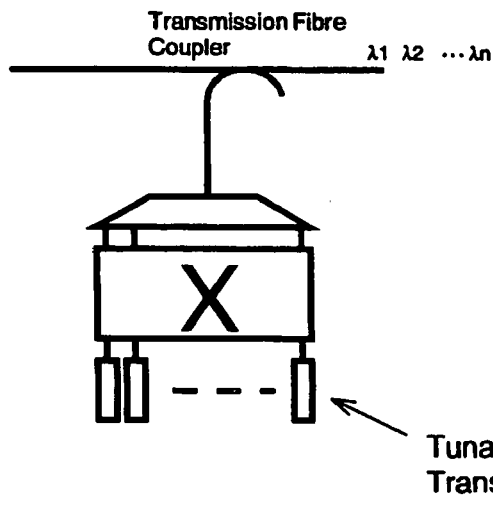
Figure 1:
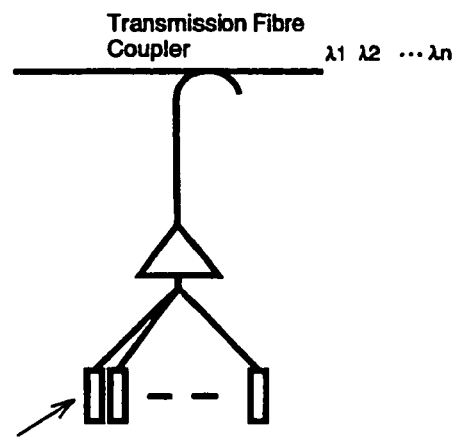

FIG. 1(*f*) shows how flexibility can be achieved with couplers as in FIG. 1(*b*) with an amplifier overcoming the splitter/coupler losses. As the channel count is increased so the gain has to be raised and the noise added to the added channels and to the "through" traffic increases.

To summarise:

FIG. 1(*a*) does not provide flexibility;

FIG. 1(*b*) introduces high loss and therefore requires higher power tunable laser sources;

FIG. 1(*c*) like FIG. 1(*a*) does not provide flexibility. It also requires switches with low cross talk;

FIG. 1(*d*) has the same problems as FIG. 1(*b*);

FIG. 1(*e*) provides flexibility but requires an n by n switch which is not widely available and which has to be provided even when adding only one channel.

FIG. 1(*f*) has an amplifier which overcomes the loss but it introduces amplified spontaneous emission noise into the path of the 'through' channels and so compromises the performance of the system.

The invention seeks to provide flexibility, gain to the source and suppression of the ASE noise.

Figure 2:
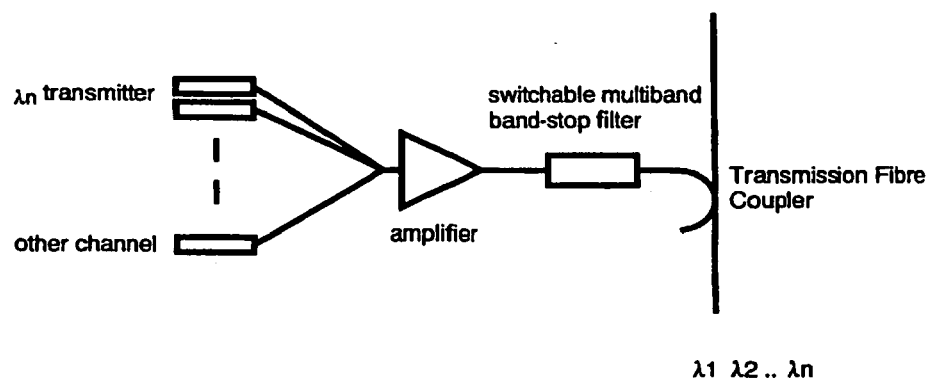
FIG. 2 shows the use of a switchable multiband band-stop filter.

It is proposed that wavelength channels are added using a waveguide or fibre coupler, an amplifier and a switchable multiband band-stop filter, as shown in FIG. 2.

Traffic is coupled into the single mode fibre. It is amplified along with all the other channels. Noise is added because of the amplified spontaneous emission in the amplifier. The switchable filter is set up so as to pass only the wavelength channels to be added. The switchable filter elements are set to have high loss in the wavelength bands of the channels which are not being added. The filter than attenuates the broadband amplified spontaneous emission from the amplifier. This reduces the noise added to the 'through' traffic channels.

Numerical modelling has shown that attenuation of the ASE becomes important for bit rates of 2½ and 10 Gbit/s and above when traffic is required to pass through several OADM nodes in a ring. The OSNR (Optical Signal to noise Ratio) of traffic passing through several (say 8) OADM nodes may be improved by several dB by using the switchable multiband band-stop filter. The use of the amplifier in the add channel path enables the number of add channels to be scaled to 32 and beyond. The amplifier allows lower power transmitter modules to be used. The switchable filter is required to attenuate the ASE by ~10 dB to 15 dB. Filter transmission loss for through channels of ~3 dB would be viable. This approach allows low power tunable laser based transmitters to be used to add up to 32 channels and more. The channels can be added as the traffic builds so equipment can be added and financed as required on a 'pay as you grow' basis—or a "partial provisioning with growth as needed" basis. For very large channel count—2 stages of combining, amplification and filtering may be used to keep the ASE within the limit to permit transmission through several nodes with acceptable signal to noise OSNR ratio.

Figure 3:
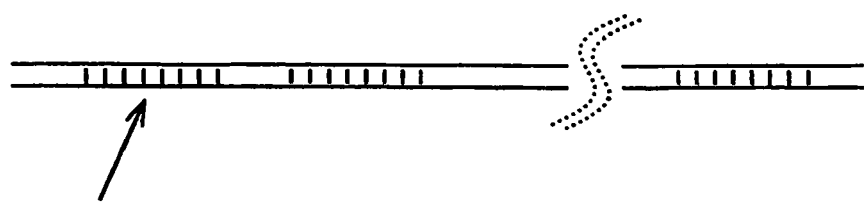
FIG. 3 shows a fibre Bragg switchable multiband band-stop filter.

The switchable multichannel filter may be implemented in one of a number of ways:

1) Fibre Bragg gratings, one for each channel, each grating tunable by temperature or strain. The fibre gratings have a bandwidth around half a wavelength channel spacing and can be tuned to pass or block the traffic. These fibre filters are produced to be arranged in a series configuration as shown in FIG. 3. The temperature needs to be raised by around 40 degrees Centigrade to tune by 50 GHz to allow traffic to pass or be attenuated. Alternatively, strain can be applied by means of a piezoelectric actuator or by magnetostriction. A specification for this type of filter is included in the tables below:

Switchable Blocker Specification

|  | Specification | Comment |
|---|---|---|
| Optical Specifications | | |
| No. of Channels | 32 | |
| Channel Spacing Frequency | 100 GHz | |
| λ range | 1535.82–1560.61 nm | |
| Switching Time | <1 s | |
| Switching Range, Frequency | 50 GHz | ~0.4 nm |
| Blocking Range | >15 dB | Additional to insertion loss in pass state. Over channel width as specified (27.5 GHz). |
| Insertion Loss in pass state | <3 dB | Note other channels may be any combination of pass or block. Over channel width as specified. |
| Dispersion in pass state | 100 ps/nm maximum | Over channel width as specified. |
| Flatness in band (pass state only) | 0.5 dB | Over channel width as specified. |
| Insertion Loss Uniformity | <1 dB | Over 32 channels. |
| Channel Width | >λ 0.11 nm | Centred on ITU channel (>27.5 GHz total) |
| Mechanical Specifications | | |
| Dimensions | 180 mm × 100 mm × 25 mm | |
| Electrical Specifications | | |
| Power Consumption | <10 W | |
| Environmental | | |
| Temperature | 0 to 70 degrees C. | |
| Qualification | Relevant Telecordia | |
| Reliability | MTBF > 10$^5$ hours | |
| Vibration | Relevant ETSI and NEBS | |

This filter requires the reflection to be electrically retuned. To permit a channel to pass the reflector grating has to be tuned to sit in the wavelength band between two channels. This is restrictive on the packing of channels into a particular band. Also it needs programming, calibration and temperature control.

Figure 4:
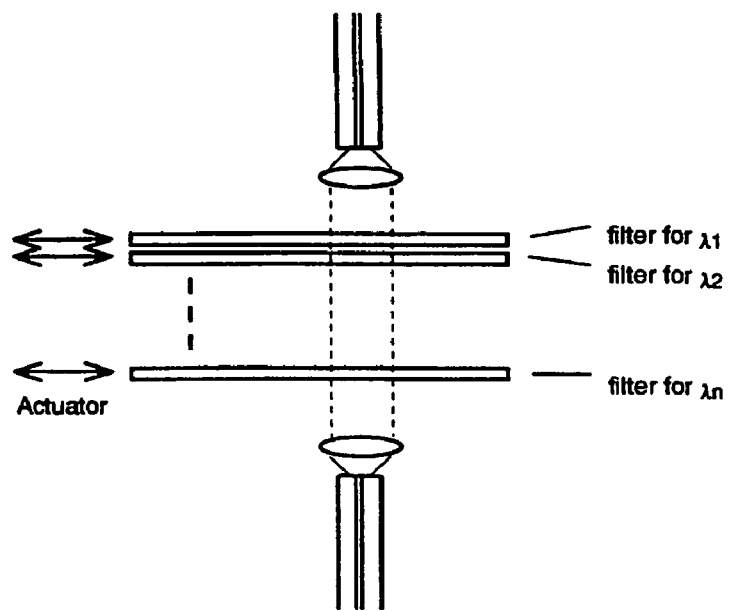
FIG. 4 shows a switchable multiband band-stop filter formed from a filter stack.

2) A filter pack can be placed in the path of the wavelength channels as shown in FIG. 4, actuators removing filters from the pack so as to allow passing of the wavelength channels to be added and the ASE in the bands of the other channels being attenuated. This is difficult to arrange mechanically and requires a precise fixed pass-band filter foe each channel.

Figure 5:
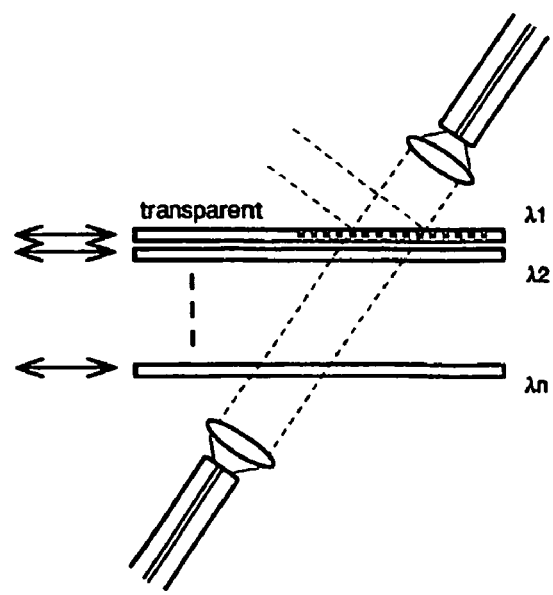
FIG. 5 shows a switchable multiband band stop filter formed from a diffraction grating stack.

3) Alternatively, diffraction gratings can be used and moved out of the beam as required or switched off if an active grating medium such as Lithium Niobate or Liquid Crystal or other electro-optic material is used as shown in FIG. 5.

Figure 6:
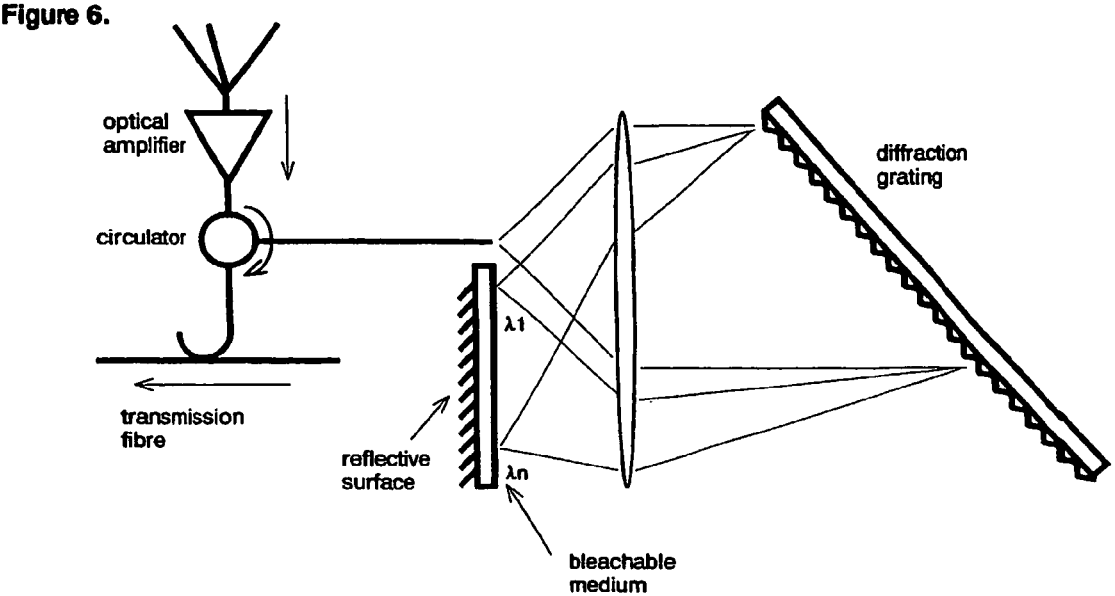
FIG. 6 shows a switchable multiband band-stop filter formed using bleachable media

4) Following a combiner and an amplifier as shown in FIG. 6, the signal is introduced into a wavelength dispersive system such as an Arrayed Wave Guide optical multiplexer as described by M. Smit and Dragoni or a diffraction grating based optical multiplexer. For example there is described the implementation in the diffraction grating demultiplexer case. The optical traffic is formed into a parallel beam incident on the diffraction grating in the optical arrangement. The diffracted beams are then imaged as separate channels on to a reversible bleachable optical medium backed by a reflective element. Where the optical intensity is high, i.e. when an add channel is present, the medium bleaches and becomes transparent and the mirror surface behind reflects this wavelength back into the optical system which couples it back into the fibre where it is coupled by a circulator into the transmission fibre. When there is no add channel present the element blocks ASE noise at that wavelength.

An example of a bleachable medium is Erbium doped $P_2O_3$ glass. Erbium can have a high concentration in $P_2O_3$ glass. 1 mm thick plate could have a few dB of loss. The radiative lifetime of erbium atoms is ~$10^{-2}$ seconds so once bleaching has occurred, it would not distort the digitally modulated signal which may have pulse lengths ~sub nanoseconds. Alternatively suitable dyes in polymer films are potential media for this as long as bleach lifetimes are significantly longer than the bit period of the traffic being passed through the filter. Also semiconductor bleachable media comprising Cadmium Telluride, or Cadmium Mercury Telluride, or Indium Gallium Arsenide Phosphide dad between Indium Phosphide layers for a double heterostructure layer could be used. Here the absorber would be a semiconductor with bandgap less than the photon energy of the traffic and the intermediate (cladding) layers will have wider band gaps. A particularly favourable bleachable material for this purpose is a multilayer stack of InP/InGaAs/InP/InGaAs in which the Indium Gallium Arsenide layers are made 0.02 μm thick and the InP layers separating the InGaAs layers 0.01 to 0.03 μm thickness. A materials specification is given in the table below:

AWG:—Arrayed Wave Guide—these are optical waveguides in a circuit designed for optical multiplexing and demultiplexing and useinterference to achieve dispersive wavelength separation MUX:—Multiplexing device—a device to combine several signal channels into one OSNR:—Optical Signal to Noise Ratio Channel:—This has been used to mean a modulated optical carrier from a single laser. The laser wavelength is selected to conform to a particular tolerance within a standard grid—the ITU 100 GHz or 50 GHz Standard Grids for example Wavelength:—this has been used to embrace a particular value and the band of wavelengths within one channel Traffic:—refers in general to the data and analogue signals being carried by the transmission system Bleachable filter:—A filter which passes optical beams having power sufficient to change the material absorption with low attenuation and significantly attenuates beams of lower power density. It is necessary that the change in absorption is reversible and not brought about by actual damage such as physical hole burning.

REFERENCES

M. K. Smit: "New focusing and dispersive planar component based on an optical phased array", Electronics Letters, vol. 24, no. 7, pp.385–386, Mar. 1988.

A. R. Vellekoop and M. K. Smit: "Four-channel integrated-optic wavelength demuliplexer with weak polarisation dependence", Journal of Lightwave Technology, vol. 9, no. 3, pp. 310–314, Mar. 1991.

| Layer No. | Material (including grades) | Composition spec. (see below) | Thickness (nm) | Quantum Well Repeats | Dopant type and conc. | Tolerances: |
|---|---|---|---|---|---|---|
| 22 | InP | | 1000 | | p = 1 e 18 | Wavelength +/− 10 nm |
| 21 | GaInAs | | 20 | | NUD (nom. Undoped) | Thickness +/− 5% Doping +/− 20% |
| 4–20(even) | InP | | 15 | 8 | NUD | Mismatch < +/−500 ppm |
| 3–19(odd) | GaInAs | | 20 | 8 | NUD | |
| 2 | InP | | 10 | | n = 1 e 17 | |
| 1 | InP | | 2000 | | n = 1 e 18 | |
| Substrate | InP | S.I. and n+ substrate | | | n = 1 e 18 | |

The attenuation of ASE is increased by having more GaInAs layers—10 is modelled to give 15 dB attenuation for the reflection geometry described above. The GaInAs layer will bleach when power increases to ~100 w/cm². If each channel is imaged to a spot of 8 μm diameter, then the bleach power will be ~50 μw. With 4μ diameter spot size the bleach power would be ~12 μw.

Instead of the diffractive grating an Arrayed Wave Guide (AWG) optical mux could be used. A transmission configuration having a mux and demux stage could also be used effectively. Then no circulator would be required but lower net attenuation (from the single pass through the bleachable layer) would result and no reflector would be required.

Definitions

ASE:—Amplified Sportaneous Emission—the added noise from an optical amplifier

C. Dragone: "An N×N optical multiplexer using a planar arrangement of two star couplers", Photonics Technobgy Letter, vol. 3, no. 9, pp. 812–815, September 1991.

The invention claimed is:

1. A telecommunications system, comprising: a single mode optical fiber carrying wave division multiplex (WDM) traffic, a transmission fiber coupler for coupling signals from channels to be added to the single mode optical fiber, coupling means for connecting the channels carrying the signals to be added to an input of an optical amplifier, the amplifier having an output connected in series to the transmission fiber coupler by a switchable multiband band-stop filter operative for passing low loss only signals having a wavelength of a signal or signals to be added to the WDM traffic, and for attenuating all signals at wavelengths not having the wavelength of the signal or signals to be added to the WDM traffic, and the band-stop filter being operative for attenuating signals which are generated as a result of amplified spontaneous emission (ASE).

2. The telecommunications system as claimed in claim 1, wherein the switchable multiband band-stop filter comprises a series of fiber Bragg grating filters.

3. The telecommunications system as claimed in claim 1, wherein the switchable multiband band-stop filter comprises a stack of selective narrow band pass filters, and actuator means for displacing respective filters to pass selected channels.

4. The telecommunications system as claimed in claim 1, wherein the switchable multiband band-stop filter comprises a stack of diffraction gratings which are removed or deactivated or activated to pass selected channels.

5. The telecommunications system as claimed in claim 1, wherein the switchable multiband band-stop filter comprises an optical wavelength channel demultiplexer for spatially separating wavelength components of the signal carried by the single mode fiber, and a bleachable reflector for intercepting separated wavelength components of the signal, and for passing low loss only signals having the wavelength of the signal or signals to be added to the WDM traffic, and for attenuating all signals at wavelengths not having the wavelength of the signal or signals to be added to the WDM traffic.

6. The telecommunications system as claimed in claim 5, further comprising a multiplexer for recombining the traffic into the single mode optical fiber.

7. The telecommunications system as claimed in claim 5, wherein the bleachable reflector comprises erbium doped glass.

8. The telecommunications system as claimed in claim 5, wherein the bleachable reflector comprises a thermally activated bleachable medium.

9. The telecommunications system as claimed in claim 8, wherein thermal activation is provided by the optical signals.

10. The telecommunications system as claimed in claim 9, wherein the thermal activation is provided by photon energy of the optical signals.

11. The telecommunications system as claimed in claim 5, wherein the bleachable reflector comprises a semiconductor bleachable medium.

12. The telecommunications system as claimed in claim 11, wherein the semiconductor bleachable medium comprises one of cadmium telluride, cadmium mercury telluride, indium gallium arsenide phosphide, and indium gallium arsenide clad between indium phosphide layers for a double hetero-structure layer.

13. The telecommunications system as claimed in claim 8, where the bleachable medium is a stack of gallium indium arsenide layers between indium phosphide or wider gap indium gallium arsenide phosphide layers, so that a bleaching threshold is that of each single layer, and an attenuation is a sum of transmissions through the multiple layers.

14. The telecommunications system as claimed in claim 6, wherein the multiplexer and the demultiplexer comprise an arrayed wave guide (AWG).

15. The telecommunications system as claimed in claim 5, further comprising an optical circulator.

* * * * *

UNITED STATES PATENT AND TRADEMARK OFFICE
CERTIFICATE OF CORRECTION

PATENT NO. : 7,164,816 B2  Page 1 of 2
APPLICATION NO. : 10/472665
DATED : January 16, 2007
INVENTOR(S) : Goodfellow It is certified that error appears in the above-identified patent and that said Letters Patent is hereby corrected as shown below:

In Column 1, Line 27, delete "spacingless" and insert -- spacing less --, therefor.

In Column 1, Line 46, delete "ie" and insert -- i.e. --, therefor.

In Column 2, Line 41, delete "court." and insert -- count. --, therefor.

In Column 3, Line 54, delete "count" and insert -- counts --, therefor.

In Column 5, in Table, delete "

| Dopant type and conc. | Tolerances: |
|---|---|
| p = 1 e 18 | Wavelength +/- 10 nm |
| NUD (nom. Undoped) | Thickness +/- 5% |
| NUD | Doping +/- 20% |
| NUD | Mismatch < +/-500 ppm |
| n = 1 e 17 | |
| n = 1 e 18 | |
| n = 1 e 18 | |

" and

UNITED STATES PATENT AND TRADEMARK OFFICE
CERTIFICATE OF CORRECTION

PATENT NO. : 7,164,816 B2  Page 2 of 2
APPLICATION NO. : 10/472665
DATED : January 16, 2007
INVENTOR(S) : Goodfellow It is certified that error appears in the above-identified patent and that said Letters Patent is hereby corrected as shown below:

insert --

| Dopant type and conc. | |
|---|---|
| p = 1 e 18 | Tolerances : |
| NUD (nom. Undoped) | |
| NUD | Wavelength +/- 10nm |
| NUD | Thickness +/- 5 % |
| n = 1 e 17 | Doping +/- 20 % |
| n = 1 e 18 | Mismatch < +/-500 ppm |
| n = 1 e 18 | |

--, therefor.

In Column 5, Line 66, delete "Sportaneous" and insert -- Spontaneous --, therefor.

In Column 6, Line 3, delete "useinterference" and insert -- use interference --, therefor.

In Column 6, Line 51, delete "Technobgy" and insert -- Technology --, therefor.

Signed and Sealed this

Thirteenth Day of January, 2009

JON W. DUDAS
*Director of the United States Patent and Trademark Office*